US008851786B2

(12) United States Patent
Snediker et al.

(10) Patent No.: US 8,851,786 B2
(45) Date of Patent: Oct. 7, 2014

(54) BULKHEAD SEALING MECHANISM

(75) Inventors: John Snediker, Felton, PA (US); Daniel Skurdal, Joppa, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1345 days.

(21) Appl. No.: 12/628,849

(22) Filed: Dec. 1, 2009

(65) Prior Publication Data
US 2011/0126474 A1 Jun. 2, 2011

(51) Int. Cl.
| F16B 21/02 | (2006.01) |
| F41F 3/077 | (2006.01) |
| F42B 39/00 | (2006.01) |
| F41F 3/073 | (2006.01) |
| F41F 3/052 | (2006.01) |
| F42B 39/20 | (2006.01) |
| F16H 1/14 | (2006.01) |

(52) U.S. Cl.
CPC ............... *F41F 3/073* (2013.01); *F41F 3/077* (2013.01); *F42B 39/00* (2013.01); *F41F 3/052* (2013.01); *F42B 39/20* (2013.01); *F16H 1/14* (2013.01)
USPC ........ 403/348; 403/350; 403/409.1; 403/288; 102/293

(58) Field of Classification Search
USPC .......... 102/293, 376, 430; 403/288, 348, 350, 403/409.1, 343; 89/1.817; 74/416, 417
See application file for complete search history.

(56) References Cited

U.S. PATENT DOCUMENTS

| 2,216,012 A | | 9/1940 | Jacob | |
| 2,561,279 A | * | 7/1951 | Holt | 15/49.1 |
| 2,833,158 A | * | 5/1958 | Damon | 74/504 |
| 2,868,565 A | | 1/1959 | Suderow | |
| 3,600,735 A | * | 8/1971 | Jerabek | 15/49.1 |
| 4,191,087 A | | 3/1980 | Campbell et al. | |
| 4,296,669 A | | 10/1981 | Debona et al. | |
| 4,376,405 A | | 3/1983 | Madderra | |
| 4,485,740 A | | 12/1984 | Boss | |
| 4,756,638 A | * | 7/1988 | Neyret | 403/261 |
| 5,056,953 A | * | 10/1991 | Marot et al. | 403/194 |
| 5,069,524 A | * | 12/1991 | Watanabe et al. | 385/59 |
| 5,086,587 A | | 2/1992 | Andrews | |
| 5,120,087 A | | 6/1992 | Pastva | |
| 5,133,617 A | * | 7/1992 | Sokn et al. | 403/349 |
| 5,597,260 A | * | 1/1997 | Peterson | 403/319 |
| 5,607,251 A | * | 3/1997 | Rafn | 403/348 |
| 5,660,493 A | * | 8/1997 | Stephens | 403/348 |
| 5,848,575 A | | 12/1998 | Freeman et al. | |
| 5,913,605 A | * | 6/1999 | Jusselin et al. | 37/451 |
| 5,954,174 A | | 9/1999 | Costin | |
| 6,292,142 B1 | * | 9/2001 | Pittman | 343/700 MS |
| 6,733,202 B2 | * | 5/2004 | Couture et al. | 403/348 |

(Continued)

*Primary Examiner* — Joshua Kennedy
*Assistant Examiner* — Matthew R McMahon
(74) *Attorney, Agent, or Firm* — Howard IP Law Group, PC

(57) ABSTRACT

A reversible sealing mechanism for sealing a bulkhead having a first central aperture defined along a central axis and disposed between first and second compartments includes a cover member having a recess defined therein by a substantially cylindrical sidewall and adapted to cover the first central aperture. A wedge ring having a generally cylindrical body is accommodated by the first and second central apertures and is configured to operatively engage the cover member. A mechanical input is operative to reversibly rotate the wedge ring about the central axis such that a rotation of the wedge ring in a first direction urges the cover member in the axial direction into a sealed position.

18 Claims, 10 Drawing Sheets

(56) References Cited

U.S. PATENT DOCUMENTS

| | | | |
|---|---|---|---|
| 6,835,893 B2 * | 12/2004 | Whipple | 174/135 |
| 6,837,645 B2 * | 1/2005 | Kanatani et al. | 403/348 |
| 7,340,928 B2 * | 3/2008 | Hoffman | 70/78 |
| 7,455,157 B2 | 11/2008 | Kimes et al. | |
| 7,537,409 B2 * | 5/2009 | Huhnerbein | 403/348 |
| 7,600,427 B2 * | 10/2009 | Palmer et al. | 73/431 |
| 7,661,215 B2 * | 2/2010 | Okamoto | 40/620 |
| 8,061,923 B2 * | 11/2011 | Simmons | 403/348 |
| 2008/0072515 A1 * | 3/2008 | Huhnerbein | 52/582.2 |
| 2008/0110906 A1 | 5/2008 | Thompson | |

* cited by examiner

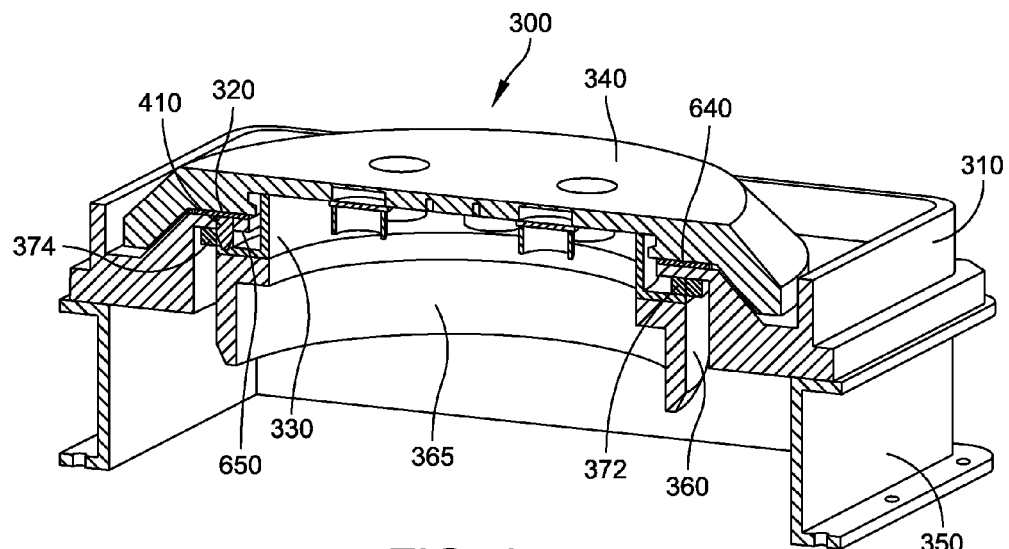
FIG. 4
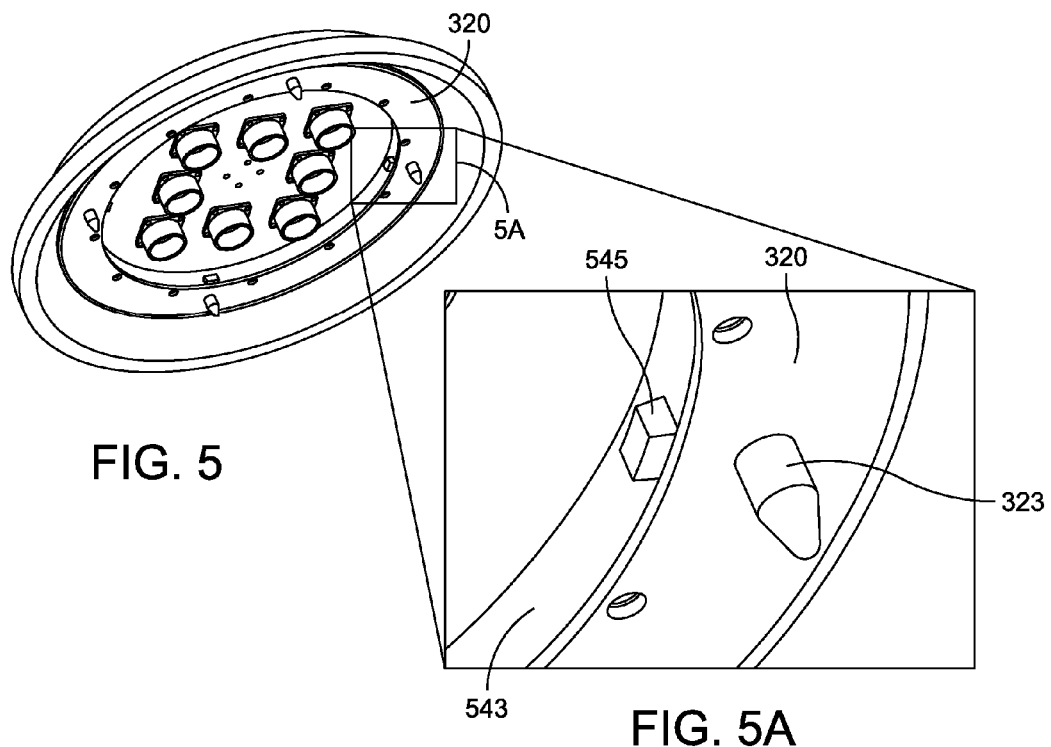
FIG. 5
FIG. 5A

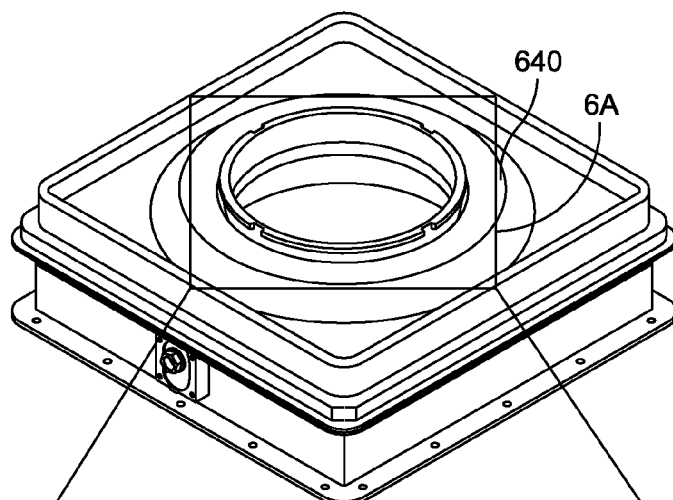
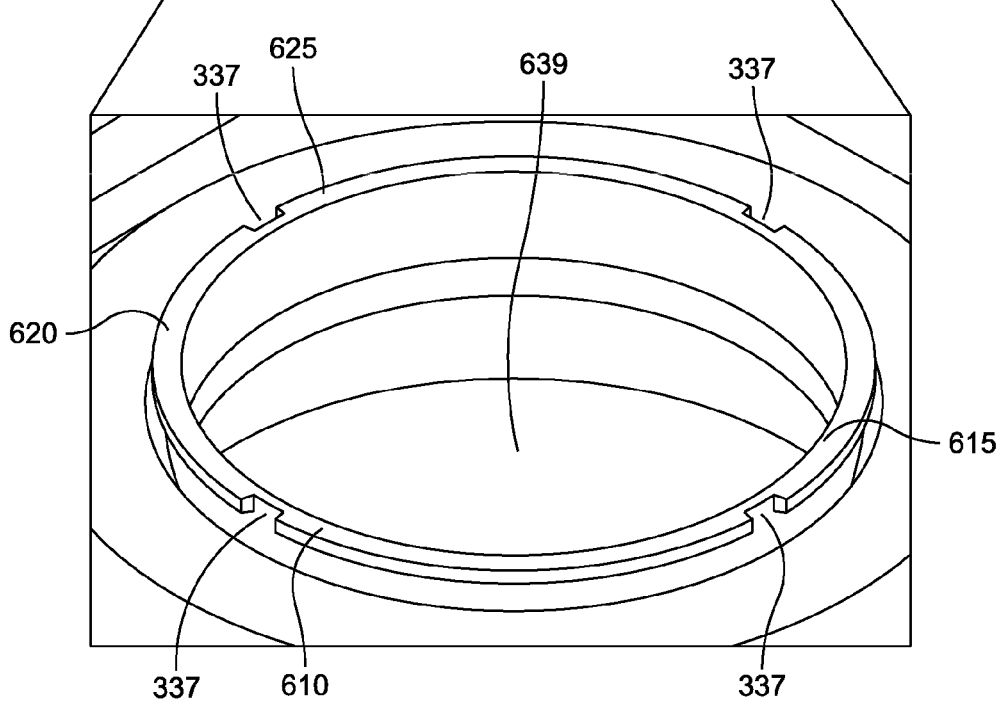
FIG. 6
FIG. 6A

BULKHEAD SEALING MECHANISM

FIELD OF INVENTION

The present invention relates in general to sealing and latching mechanisms.

BACKGROUND

Various applications require sealing off a first compartment relative to a second compartment in a structure, for example, where the first compartment is pressurized while the second compartment is non-pressurized. One such application is a launcher shell 100 illustrated in FIGS. 1 and 2, wherein the munition is stored in a first pressurized compartment 120 and associated electronic components may be located in a second non-pressurized compartment 140. An opening 135 in second non-pressurized second compartment 140 provides access to the electronic components located therein. The electronic components in second compartment 140 may be electrically coupled to the munition in first compartment 120 via electric cables. These electric cables pass through an opening 155 in a bulkhead 150 disposed between first compartment 120 and second compartment 140. A munition adapter 210 is coupled to the munition and is securely fastened to bulkhead 150, thereby covering opening 155. One conventional approach is to use a number of bolts to secure the munition adapter 210 to the bulkhead 150. Bolts may be received by aligned apertures 222, 224 in bulkhead 150 and adapter 210 respectively. A sealing element 230 is disposed between adapter 210 and bulkhead 150, thereby sealing first compartment 120 relative to second compartment 140. However, such an approach is labor and time intensive and does not permit quick installation and removal of the munition from the launcher 100. Still further, such bolts or other fasteners have to be accessed through second compartment 140. Furthermore, there is no simple method to determine whether all the bolts or other fasteners are appropriately secured. Alternative sealing and latching mechanisms permitting quick installation/removal while providing access to generally centrally located cables emanating from the munition adapter are, therefore, desirable.

SUMMARY OF THE INVENTION

According to an embodiment of the invention, a sealing mechanism for reversibly sealing a passage between first and second compartments includes a bulkhead having a central aperture defined about a central axis and upper and lower major surfaces. The bulkhead is disposed between the first and second compartments. The central aperture defines the passage between the first and second compartments. A wedge ring having a generally cylindrical body is accommodated by the first and second central apertures of the bulkhead and the sealing ring respectively. The wedge ring has an upper lip and a lower lip projecting radially outward from the cylindrical body. A lower surface of the upper lip slopes towards the lower lip in a circumferential direction about the wedge ring. The lower lip has an outer diameter larger than the first central aperture. A cover member covers at least the first central aperture and has a substantially cylindrical sidewall defining a recess defined therein by. The recess faces the bulkhead. At least first and second protrusions extend radially inward from an interior surface of the sidewall into the recess. The recess receives at least the upper lip of the wedge ring. The sealing mechanism further includes a mechanical input operative to rotate the wedge ring about the central axis reversibly between a sealed position and an unsealed position within a first angular range. As the wedge ring is rotated from the unsealed position to a sealed position, the lower surfaces of the at least first and second upper lips slidingly engage and urge axially the at least first and second protrusions respectively toward the bulkhead.

In an embodiment of the invention, the sealing mechanism further includes a sealing ring having a second central aperture defined about the central axis and aligned with the first central aperture is disposed between the upper major surface of the bulkhead and the cover member.

In an embodiment of the invention, the sealing mechanism further includes a first gear cooperatively coupled to and reversibly rotatable by the mechanical input along a second axis within a second angular range about a third direction and a fourth direction opposite the third direction. A second gear having a third central aperture defined along the central axis is fastened to the wedge ring and cooperatively coupled to and reversibly rotatable by the first gear. A rotation of the first gear within the second angular range about the third and fourth directions causes the wedge ring to rotate within the first angular range about the first and second directions respectively.

According to an embodiment of the invention, a reversible sealing mechanism for sealing a bulkhead having a first central aperture defined about a central axis and disposed between first and second compartments includes a cover member is configured to cover the first central aperture. The cover member has a substantially cylindrical sidewall defining a recess defined therein. A wedge ring has a generally cylindrical body accommodated by the first and second central apertures and is operatively engaged with the cover member. A mechanical input is operative to rotate the wedge ring about the central axis such that a rotation of the wedge ring in a first direction causes the wedge ring to urge the cover member in the axial direction into a sealed position. A rotation of the wedge ring in a second direction opposite the first direction about the central axis causes the wedge ring to urge the cover member in the axial direction away from the bulkhead into an unsealed position.

According to an embodiment of the invention, a method for sealing a passage between a first and a second compartment includes the step of actuating a single mechanical input. Responsive to the actuation of the single mechanical input, a generally cylindrical wedge ring disposed in a first central aperture defined in a bulkhead about a central axis is reversibly rotated about the central axis. The first central aperture in the bulkhead defines the passage between the first and second compartments. The wedge ring is reversibly rotatable within a first angular range about the central axis in a first direction to a sealed position and in a second direction to an unsealed position. Responsive to the rotation of the wedge ring, a cover member operatively engaged with the wedge ring is axially urged toward the bulkhead to secure a sealing ring between the cover member and the bulkhead, thereby sealing the passage.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which:

FIG. 4 is a cross-sectional view of the sealing mechanism of FIG. 3, according to an embodiment of the invention;

FIG. 5 is a perspective bottom view of a munition adapter base of the sealing mechanism of FIG. 3, according to an embodiment of the invention;

FIG. 5A illustrates an enlarged view of a section of a sealing ring of FIG. 5, according to an embodiment of the invention;

FIG. 6 is a perspective top view of a wedge ring and of the sealing mechanism of FIG. 3, according to an embodiment of the invention;

FIG. 6A is an enlarged top view of the wedge ring of FIG. 6, according to an embodiment of the invention;

DETAILED DESCRIPTION

Figure 1:
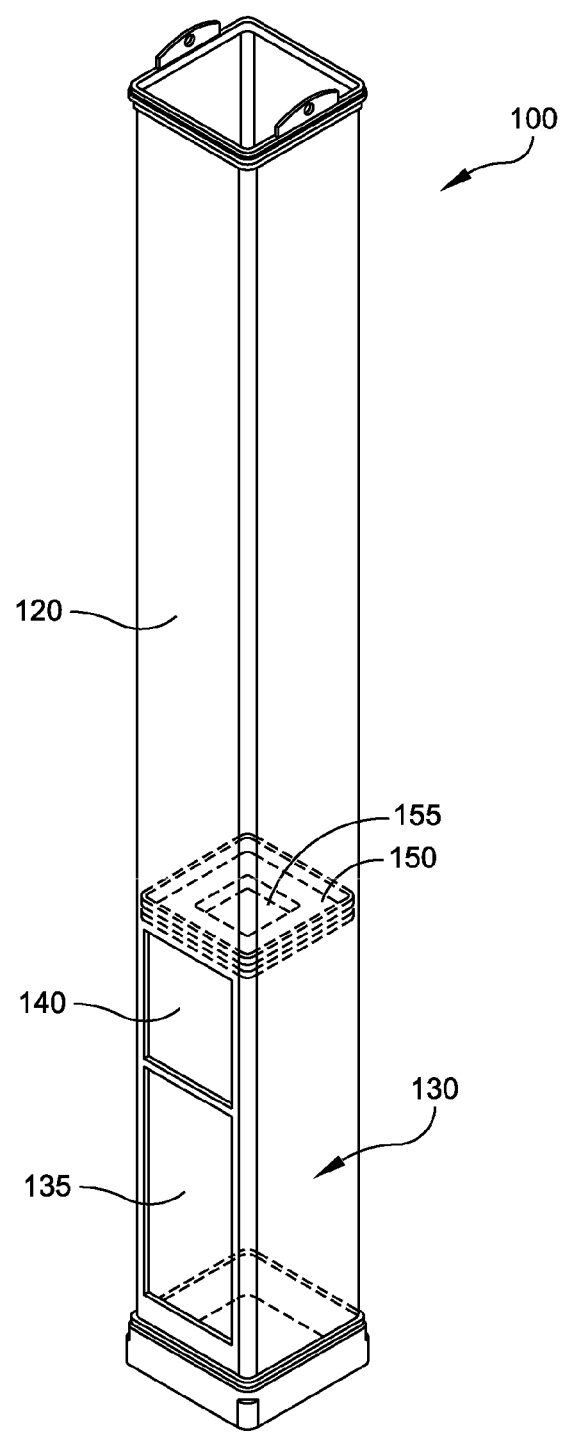
FIG. 1 illustrates a prior art munition launcher having first and second compartments.
Figure 2:
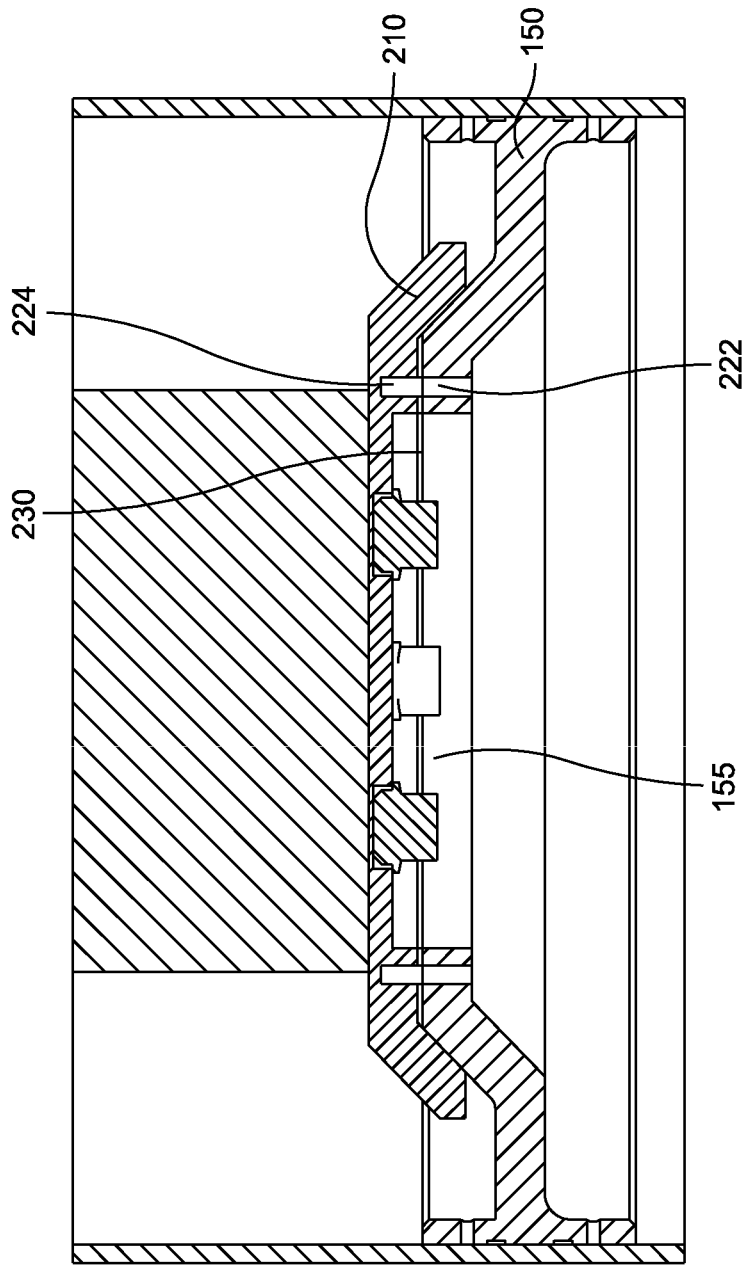
FIG. 2 is a partial cross-sectional view of the launcher of FIG. 1, showing a prior art sealing mechanism for securing a munition adapter to a bulkhead interface in the launcher.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Figure 3A:
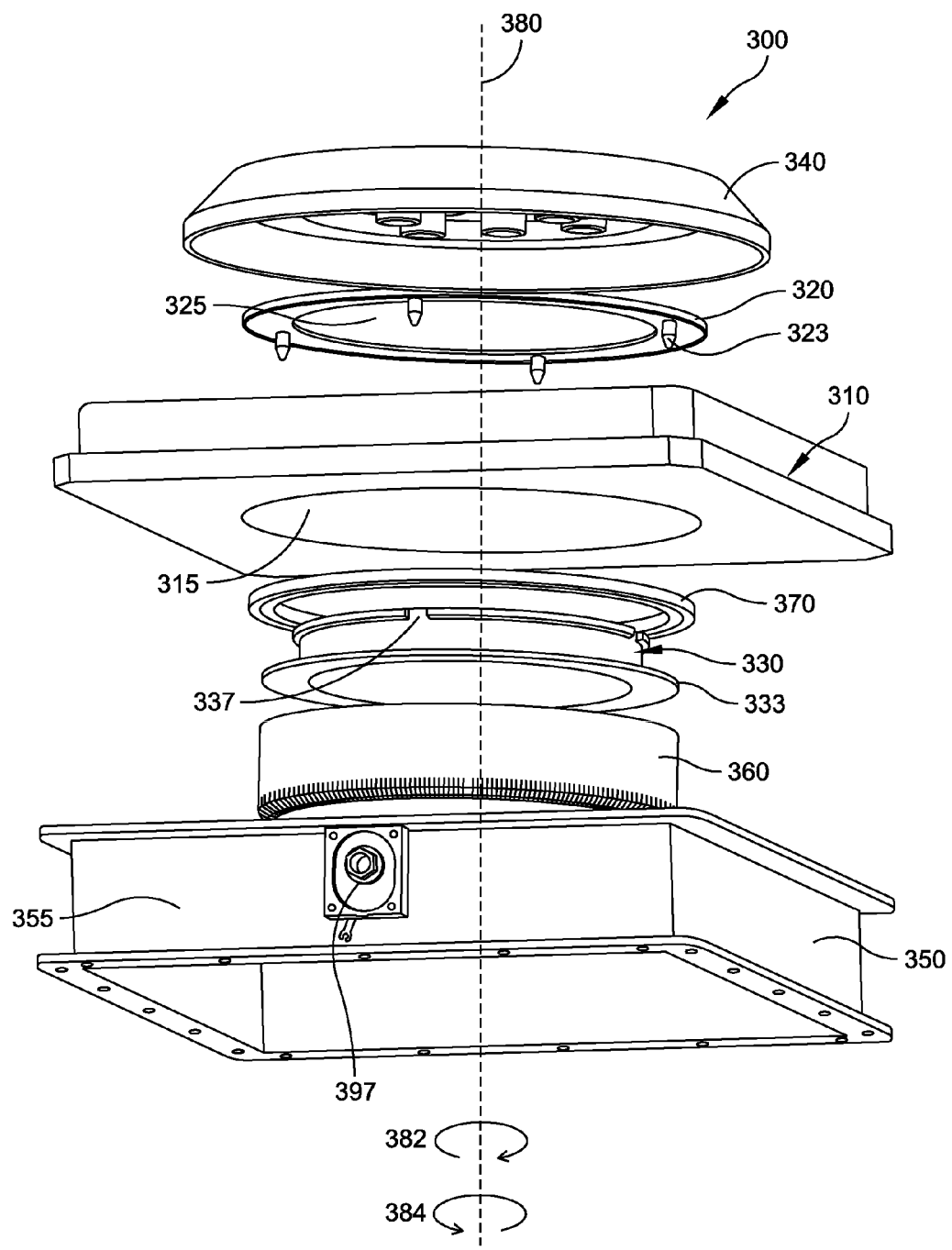
FIG. 3A is an exploded view of a sealing mechanism for securing a munition adapter to a bulkhead interface in the launcher, according to an embodiment of the invention.
Figure 3B:
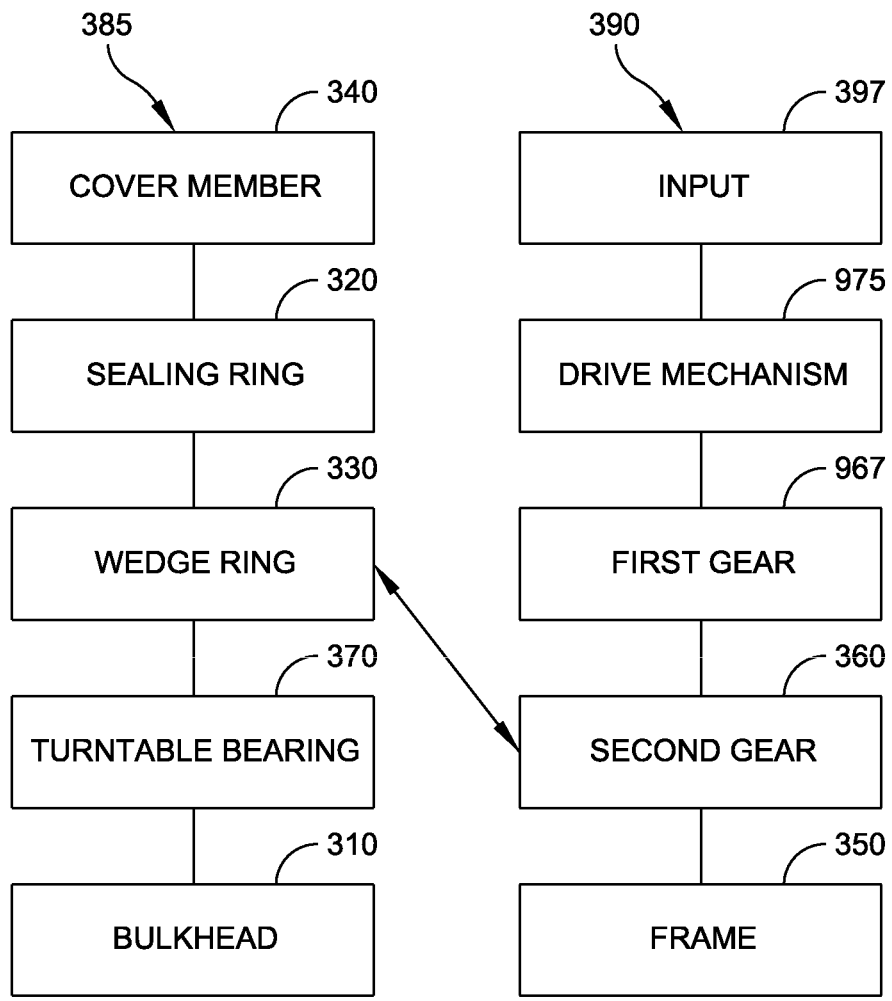
FIG. 3B is a block diagram depicting a sealing sub-assembly and a drive sub-assembly of the sealing mechanism of FIG. 3A.

Referring now to FIGS. 3A, 3B and 4, there is illustrated an exploded view of a sealing mechanism 300, according to an embodiment of the invention. Mechanism 300 includes a bulkhead 310 disposed between a first compartment 120 (see FIG. 1) and a second compartment 140 (see FIG. 1) within a launcher shell 100 (see FIG. 1). In one configuration, first compartment 120 is a pressurized compartment housing the munition and second compartment 140 is a non-pressurized compartment housing, by way of non-limiting example only, the electronics associated with the munition. Bulkhead 310 includes a first central aperture 315 along a central axis 380 defined therein. Bulkhead 310 has upper and lower major surfaces 640, 650. First central aperture 315 defines a passage between first and second compartments 120, 140. An exemplary configuration of bulkhead 310 may have a width of about 622 millimeters (mm), a length of about 622 mm, a diameter of first central aperture of about 330 mm, and a thickness of about 76 mm between upper major surface 640 and lower major surface 650.

Mechanism 300 includes a sealing sub-assembly 385 and a drive sub-assembly 390. Sealing sub-assembly 385 operates to establish and to release a seal between a cover member 340 (by way of non-limiting example only, a munition base adapter) and bulkhead 310, thereby sealing and unsealing first compartment 120 relative to second compartment 140 within launcher shell 100 (see FIG. 1). Drive sub-assembly 390 serves to control the operation of sealing sub-assembly 385, which, in turn, operates to quickly latch and unlatch cover member 340 relative to bulkhead 310.

Figure 9A:
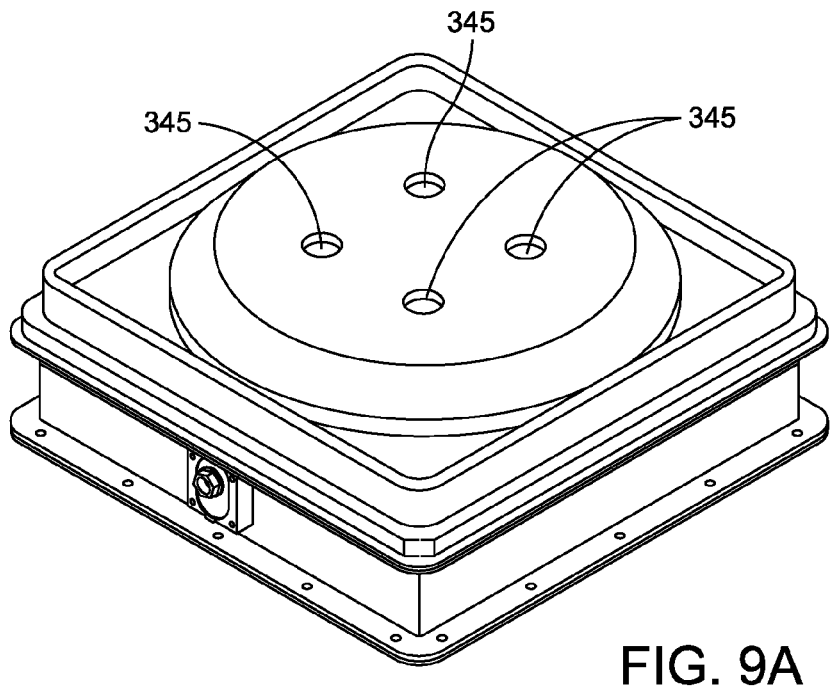
FIG. 9A illustrates a top perspective view of the munition adapter base secured to the bulkhead of FIG. 3, according to an embodiment of the invention.
Figure 9B:
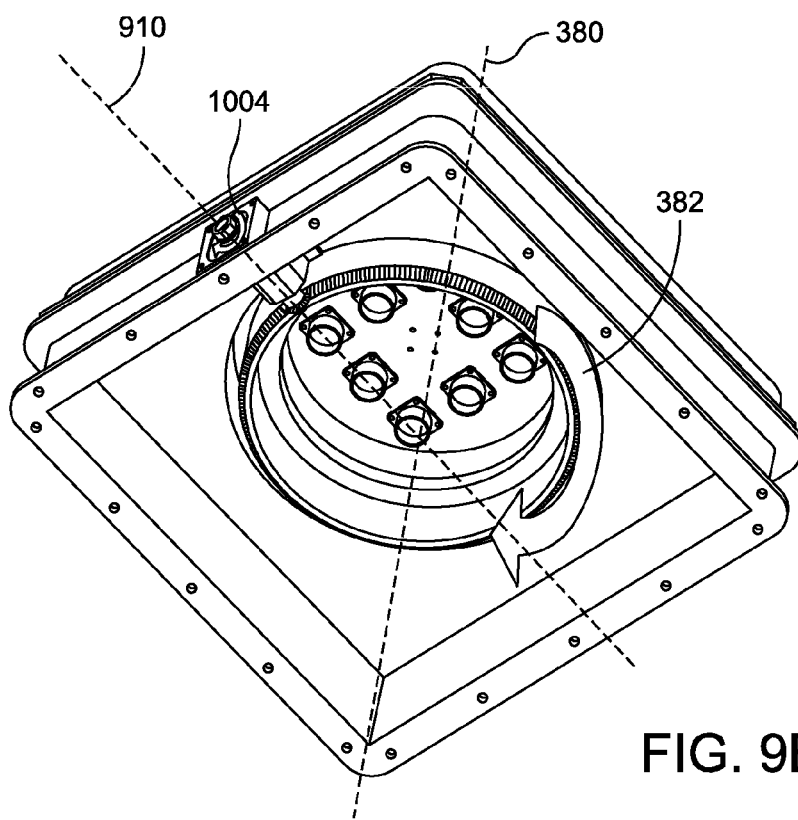
FIG. 9B illustrates a bottom perspective view of the munition adapter base secured to the bulkhead of FIG. 3, according to an embodiment of the invention.
Figure 9C:
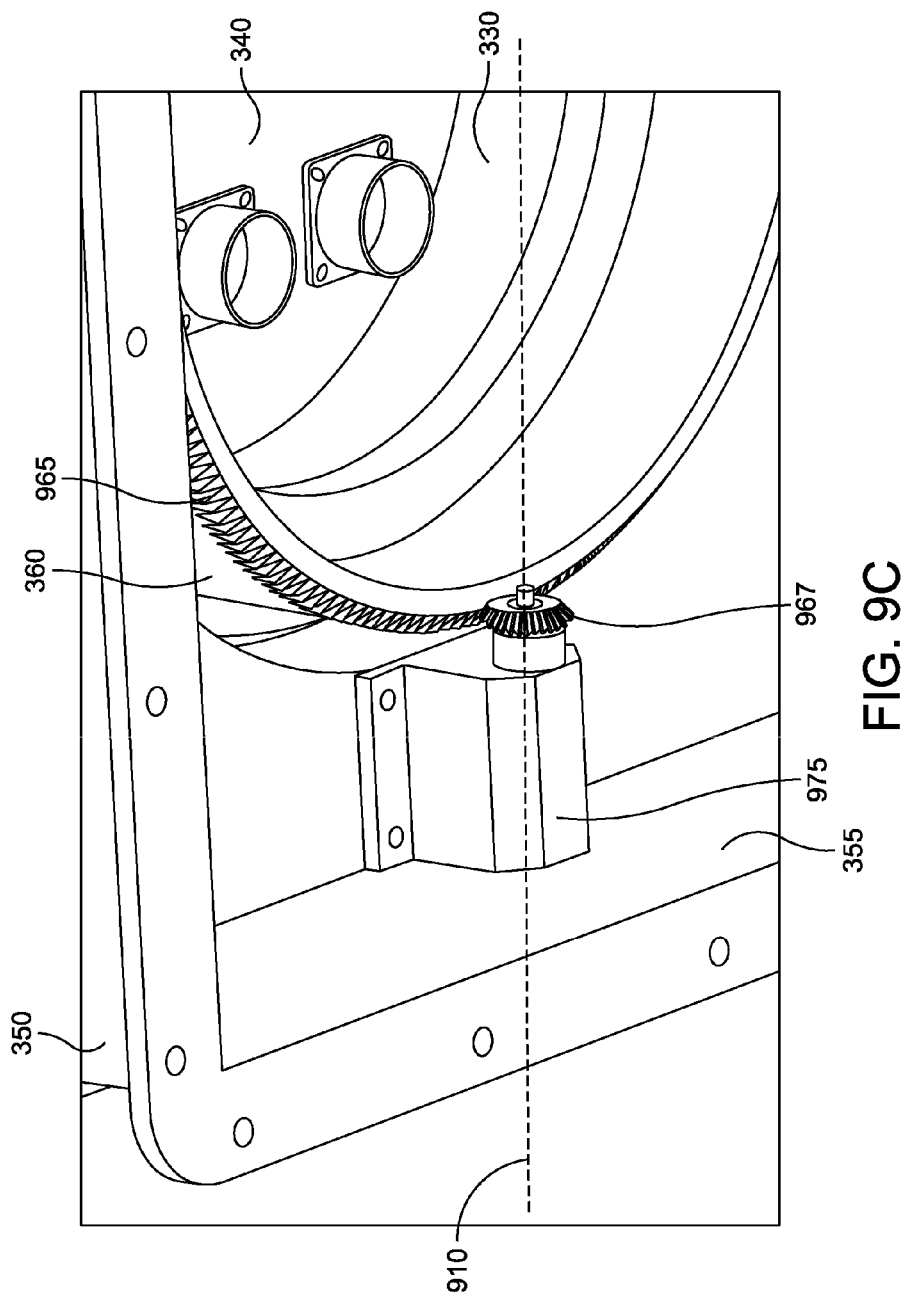
FIG. 9C illustrates a partial bottom perspective view of a single mechanical input and gearing mechanism for the bulkhead of FIG. 3, according to an embodiment of the invention.
Figure 10:
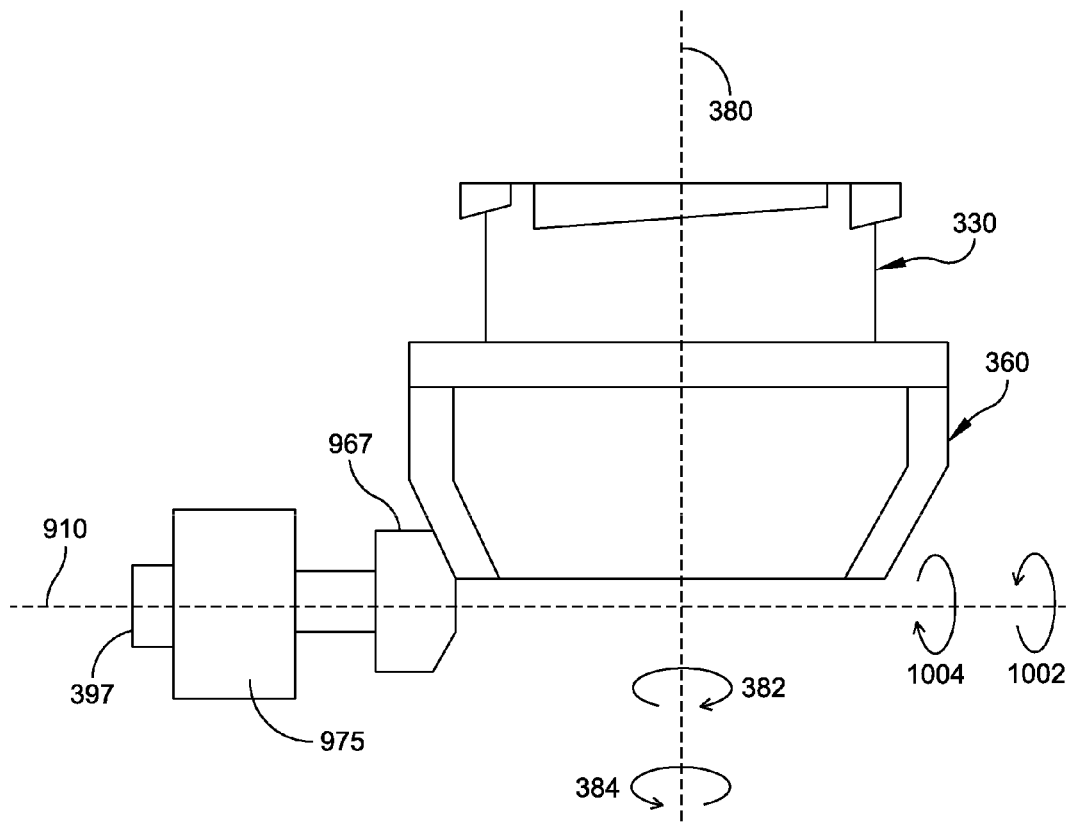
FIG. 10 is a schematic side view of the single mechanical input, the gearing mechanism and the wedge ring of the sealing mechanism of FIG. 3, according to an embodiment of the invention.

In an exemplary embodiment, sealing sub-assembly 385 comprises a cover member 340, a sealing ring or member 320, a wedge ring 330, a turntable bearing 370, and bulkhead 310. In another embodiment, a resilient sealing material, for example, a resilient rubber, may be disposed on cover member 340 and/or bulkhead 310, thereby dispensing the need of sealing ring or member 320. Further reference to sealing ring 320 is intended to include such a ring of resilient rubber formed integral with cover member 340 and/or bulkhead 310. Drive sub-assembly 390 comprises an input 397, a drive mechanism 975 (of FIG. 9), a first gear 967 (of FIG. 9), a second gear 360, and a frame 350, according to an illustrative embodiment of the invention. Input 397 and drive mechanism 975 together constitute a single mechanical input.

In an exemplary embodiment, sealing ring 320 takes the form of a generally planar sealing ring having a second central aperture 325 defined along central axis 380. Second central aperture 325 is generally aligned with and concentric to first central aperture 315. In one configuration, sealing ring 320 includes at least one alignment pin 323 (of FIG. 5A) projecting generally orthogonally from sealing ring 320 in an axial direction along central axis 380. Bulkhead 310 includes corresponding at least one through aperture 410 running from upper major surface 640 to lower major surface 650 to receive the at least one alignment pin 323. In an exemplary embodiment, sealing ring 320 may have a diameter of about 432 mm, a thickness of about 3.5 mm, and a second central aperture diameter of about 330 mm. In one configuration, sealing ring 320 may be made of nitrile rubber with a stainless steel frame.

Figure 7:
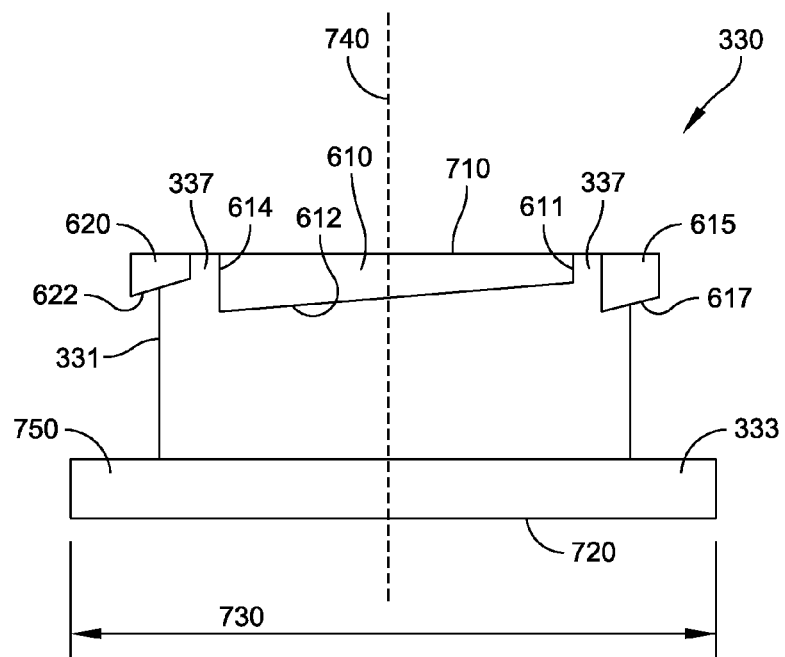
FIG. 7 is a schematic side view of a wedge ring of the sealing mechanism of FIG. 3, according to an embodiment of the invention.

Referring also to FIGS. 6, 6A and 7, in an exemplary embodiment, wedge ring 330 takes the form of a generally cylindrical wedge ring. Wedge ring 330 includes a generally cylindrical hollow body 331 encompassing an open space 639. Cylindrical hollow body 331 is defined about central axis 380 and is generally aligned with and accommodated in first central aperture 315 of bulkhead 310. In one configuration, wedge ring 330 includes first and second upper lips 610, 620 and a lower lip 333 projecting radially outward from cylindrical body 331. It will be understood that, in other embodiments, wedge ring 330 may have more than or fewer than two upper lips, depending on the requirements of a particular application. By way of non-limiting example only, in the illustrated embodiment of FIG. 6A, wedge ring 330 includes first, second, third, and fourth upper lips 610, 620, 625, 615. Each upper lip 610, 620, 625, 615 extends circumferentially from a first gap or indent 337 to a second gap or indent 337. In the illustrated embodiment, each of first, second, and third upper lips 610, 620, 615 has a respective lower surface 612, 622, 617, sloping towards lower lip 333 in a circumferential direction about cylindrical body 331. It will be understood that fourth upper lip 625 has a similar lower surface sloping down toward lower lip 333 in a circumferential direction about cylindrical body 331. In an exemplary embodiment, lower surfaces 612, 622, 617 slope in the same direction about cylindrical body 331 and have the same pitch. By way of non-limiting example, lower surfaces 612, 622, 617 slope down toward lower lip 333 in a clockwise direction about cylindrical body 331. It will be understood that in another embodiment, lower surfaces 612, 622, 617 may slope down toward lower lip 333 in a counter-clockwise direction about cylindrical body 331. In yet another embodiment of the invention, each of first and second upper lips 610, 620 may take the form of a spiral lip projecting radially outward from cylindrical body 331 and spiraling down toward lower lip 333. In another embodiment, first upper lip 610 may take the form of one or more external threads formed on cylindrical body 331.

Lower lip 333 has an outer diameter 730 larger than first central aperture 315 of bulkhead 310. In one configuration, upper surface 750 of lower lip 333 is adapted to be securely fastened to an inner rotatable element 372 of turntable bearing 370. An outer rotatable element 374 of turntable bearing 370 is securely fastened to lower major surface 650 of bulkhead 310. In one configuration, turntable bearing 370 may take the form of a dual race ball bearing. In an exemplary embodiment, a lower surface 720 of lower lip 333 is configured or adapted to be securely fastened to second gear 360 of the drive sub-assembly, for example, by adhesive or a weld. In an exemplary embodiment, wedge ring 330 and second gear 360 may take the form of a unitary structure. Wedge ring 330 is disposed through first central aperture 315 such that lower surfaces 612, 622 of at least first and second upper lips 610, 620 face upper major surface 640 of bulkhead 310 and upper surface 750 of lower lip 333 faces lower major surface 650 of bulkhead 310.

Wedge ring 330 is reversibly rotatable about central axis 380 between a sealed position and an unsealed position within a first angular range. In an exemplary embodiment, first angular range is about 90° for a wedge ring 330 with first, second, third, and fourth upper lips 610, 620, 625, 615. In another embodiment with a wedge ring 330 having first and second upper lips 610, 620, the first angular range about central axis 380 may be about 180°. In yet another embodiment with a wedge ring 330 having three upper lips, the first angular range may be about 120°. It will, thus, be understood that the first angular range generally corresponds to 360° divided by the number of upper lips of wedge ring 330.

In an exemplary embodiment, cylindrical body 331 may have a height of about 42 mm and a thickness of about 7 mm. By way of non-limiting example only, upper lips 610, 620, 625, 615 may have a tapered profile having a first thickness 614 of about 9 mm at first end and a second thickness 611 of about 6.4 mm at the second end. Gaps or indents 337 may be about 22 mm long.

Figure 8:
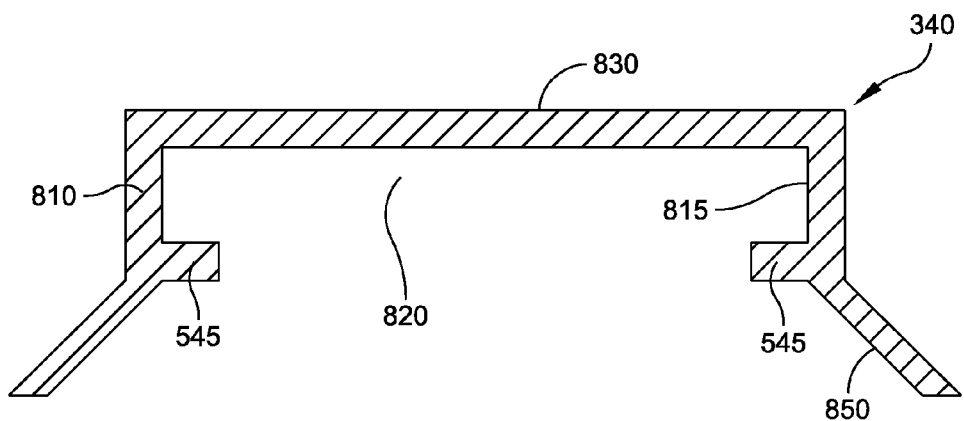
FIG. 8 is a schematic cross-sectional view of a munition adapter base of the sealing mechanism of FIG. 3, according to an embodiment of the invention.

Referring now to FIGS. 3A, 4, and 8, an exemplary embodiment of cover member 340 will be described. Cover member 340 is adapted or configured to cover first central aperture 315. Cover member 340 includes a peripheral lip 850 and a recess 820 defined therein by a substantially cylindrical sidewall 810 and a top wall 830. Peripheral lip 850 is adapted to be in at least partial surface engagement with upper major surface 640 of bulkhead 310. In one configuration, a resilient rubber ring may be fastened to peripheral lip 850, which rubber ring may be in at least partial surface engagement with upper major surface 640 of bulkhead 640. Recess 820 faces upper major surface 640 of bulkhead 310. At least first and second protrusions 545 extend radially inward from an interior surface 815 of sidewall 810 into recess 820. It will be understood that the number of protrusions 545 may be varied according to the requirements of a given application. The circumferential length of protrusions 545 may not be greater than the length of gaps or indents 337.

In an exemplary embodiment, first and second protrusions 545 are at a same axial distance from top wall 830. In other embodiments, first and second protrusions 545 may be at different axial distances from top wall 830, in which case a single upper lip 610 may engage first and second protrusions 545, as wedge ring 330 is rotated about central axis 380. In one configuration, first and second protrusions 545 are diametrically opposite each other along cylindrical sidewall 810. The higher the number of protrusions and the more even the distribution of protrusions 545 along sidewall 810, the more even the distribution of the circumferential force about the sealing ring by cover member 340. In another exemplary embodiment, first and second protrusions 545 may take the form of one or more internal threads formed on interior surface 815 of sidewall 810. In an exemplary embodiment, first and second protrusions 545 in the form of one or more internal threads engage upper lip 610 of wedge ring 310 in the form of one or more external threads. Cover member 340 may, thus, act in a fashion similar to a nut with internal threads and wedge ring 330 may correspondingly act in a fashion similar to a bolt with external threads. Recess 820 is adapted to receive and accommodate at least first and second upper lips 610, 620 of wedge ring 330. Cover member 340 also includes a plurality of through apertures 345 (of FIG. 9A) adapted to receive, for example, cable interfaces. In one configuration, recess 820 may have a diameter of about 330 mm and sidewall 810 may have a depth of about 9 mm.

Referring now to FIGS. 3A, 4, 9A-9C, and 10, drive sub-assembly 390 of mechanism 300 will be described. In one configuration, drive mechanism 975 may take the form of a ratchet clutch drive. Drive mechanism 975 is reversibly operable about second axis 910 within a second angular range. First gear 967 is cooperatively coupled to drive mechanism 397. Second gear 360 of drive sub-assembly 390 is securely fastened to wedge ring 330 of sealing sub-assembly 385 such as by an adhesive or a weld. In an exemplary embodiment, turntable 370 serves to hold second gear 360 and wedge ring 330 in a secured axial position relative to bulkhead 310, within first aperture 315. For example, outer rotatable element 374 may be securely fastened to lower major surface 650 of bulkhead 310 and inner rotatable element 372 may be securely fastened to upper surface 750 of lower lip 333 of wedge ring 330. Turntable 370, thus, serves to constrain axial motion of wedge ring 330 relative to bulkhead 310, while enabling rotational motion of wedge ring 330 about central axis 380. In the illustrated embodiment, frame 350 is disposed in second compartment 140 and bulkhead 310 is disposed on frame 350. Bulkhead 310 serves to delimit first compartment 120 from second compartment 140. Frame 350 includes an input 397 to drive mechanism 395. Input 397 is accessible through shell 130 of second compartment 140 outside of second compartment 140.

Second gear 360 has a third central aperture 365 (of FIG. 4) defined along central axis 380. Third central aperture 365 is generally concentric to and aligned with open space 639 of wedge ring 330. Second gear 360 is securely fastened at the upper end to lower surface 720 of lower lip 333 of wedge ring 330. In an exemplary illustrated embodiment of the invention, second gear 360 takes the form of a bevel gear with gear teeth 965 defined along the lower end of second gear 360, opposite the upper end. A first gear 967 is cooperatively coupled to second gear 360. In one configuration, first gear 967 is also a bevel gear adapted to operatively engage second bevel gear 360. Second gear 360 and wedge ring 330, thus, are reversibly rotatable by first gear 967 about central axis 380 in a first direction depicted by arrow 382 about central axis 380 and a second direction depicted by arrow 384 opposite first direction depicted by arrow 382. In the illustrated embodiment, first direction depicted by arrow 382 is counter-clockwise about central axis 380 as seen from the top of FIG. 3 and second direction depicted by arrow 384 is clockwise about central axis 380 as seen from the top of FIG. 3. First gear 967 is, in turn, cooperatively coupled to and reversibly rotatable by drive mechanism 975. First gear 967 is reversibly rotatable within the second angular range about a second axis 910. In particular, first gear 967 is rotatable about second axis 910 in a third direction depicted by arrow 1002 and a fourth direction depicted by arrow 1004 opposite the third direction depicted by arrow 1002. In the embodiment illustrated in FIG. 10, the third direction depicted by arrow 1002 is counter-clockwise about second axis 910 as seen from the left side of FIG. 10 and the fourth direction depicted by arrow 1004 is clockwise about second axis 910 as seen from the left side of FIG. 10. Second axis 910 is generally perpendicular to central axis 380. The second angular range is a function of the first angular range and the pitch angle of first gear 967 and second gear 360. One of ordinary skill in the art will appreciate that the pitch angle of first gear 967 and second gear 360 may be varied to adjust the first and second angular ranges. Drive mechanism 975 is operative via single input 397. Input 397 is accessible through a wall 355 of frame 350 and from outside shell 130 (of FIG. 1) of second compartment 140.

Referring now to FIG. 4, 8, 9B, 9C, and 10, operation of mechanism 300 will be described. Cover member 340 is disposed over upper major surface 640 of bulkhead 310 such that at least first and second protrusions 545 are aligned with and axially separated from gaps 337 between first and second upper lips 610, 620. Sealing ring 320 is interposed between cover member 340 and bulkhead 310. Turntable bearing 370 is interposed between lower lip 333 and lower major surface 650 of bulkhead 310, and secures wedge ring 330 within first aperture 315.

In a first operational step, drive mechanism 975 is actuated through single input 397 in the fourth direction depicted by arrow 1004 within the second angular range about second axis 910. Responsive to the actuation, drive mechanism 975 causes first gear 967 to rotate about second axis 910. First gear 967, in turn, causes second gear 360 and wedge ring 330 securely fastened to second gear 360 to rotate about central axis 380 in the first direction depicted by arrow 382. The rotation of wedge ring 330 causes wedge ring 330 to operatively engage cover member 340 and axially urge cover member 340 toward bulkhead 310. By way of non-limiting example only, illustrated lower surfaces 612, 622, 617 of respective upper lips 610, 620, 615 of wedge ring 330 may slidingly engage and urge axially corresponding first, second, and third protrusions 545 of cover member 340 toward bulkhead 310. Thus, sealing ring 320 is secured between cover member 340 and bulkhead 310. The passage between first compartment 120 and second compartment 140 is, therefore, covered by cover member 340 and sealed by sealing ring 320.

In a second operational step, drive mechanism 975 is actuated through single input 397 in the third direction depicted by arrow 1002 within the second angular range about second axis 910. Responsive to the actuation, drive mechanism 975 causes first gear 967 to rotate about second axis 910. First gear 967, in turn, causes second gear 360 and wedge ring 330 securely fastened to second gear 360 to rotate about central axis 380 in the second direction depicted by arrow 384. The rotation of wedge ring 330 causes wedge ring 330 to gradually disengage from cover member 340 and allow cover member 340 to be disengaged from bulkhead 310. By way of non-limiting example, illustrated lower surfaces 612, 622, 617 of wedge ring 330 gradually slidingly disengage from corresponding first, second, and third protrusions 545 and allow cover member 340 to be released away from bulkhead 310. As the axial force on sealing ring 320 decreases the passage between first compartment 120 and second compartment 140 is gradually unsealed.

In an exemplary embodiment, sealing mechanism 300 further includes an electronic sensor. The electronic sensor may be adapted to sense the rotational displacement of wedge ring 330. The rotational displacement of wedge ring 330 is indicative of the state of sealing mechanism 300. If the rotational displacement of wedge ring 330 is zero, it is indicative of the fact that wedge ring 330 is not engaged with cover member 340 and thus, the passage is unsealed. If, on the other hand, the rotational displacement of wedge ring 330 is the maximum of the first angular range, it is indicative of the fact that wedge ring 330 is completely engaged with cover member 340 and thus, the passage is completely sealed. Finally, the rotational displacement of wedge ring 330 is somewhere in between the two positions, it is indicative of the fact wedge ring 330 is only partially engaged with cover member 340 and thus, the passage is only partially sealed. As such electronic sensors, such as plunger-type electrical contacts and optical detectors, for sensing a rotational displacement of a component are known in the art, no further description is provided for the sake of brevity. As is also known in the art, such an electronic sensor may be monitored locally or remotely to ascertain the state of sealing mechanism 300.

An advantage of the sealing mechanism described herein is that a single input operates to rapidly seal and unseal the passage between the first and second compartments of the launcher shell via quick or rapid latching and unlatching of the sealing mechanism. This is particularly advantageous when compared with the labor and time consuming method of using numerous conventional bolts to manually fasten and unfasten the adapter base to and from the bulkhead. Another advantage of the sealing mechanism of the present invention is that the single input is accessible from outside the shell of the launcher as opposed to the conventional bolts which may be accessed only through the second compartment. Yet another advantage of the present mechanism is that it is relatively easy to ascertain whether passage has been sufficiently sealed by incorporating an electronic sensor to monitor the rotational motion or displacement of the wedge ring. Such an electronic sensor may be locally or remotely monitored to ascertain the sealed or unsealed state of the sealing mechanism by monitoring the rotational displacement of the wedge ring. The sealing mechanism further provides an evenly distributed circumferential force about the sealing ring to seal the bulkhead interface as a plurality of upper lips on the wedge ring engage and axially urge a corresponding plurality of protrusions in the cover member toward the bulkhead. The quick-latching sealing mechanism also provides an unobstructed central aperture through which cables, for example, from the second compartment may interface with the munition in the first compartment through the cover member.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A reversible sealing mechanism for sealing a bulkhead disposed between first and second compartments, the bulkhead having a first central aperture defined about a central axis, said mechanism comprising:
    a cover member configured to cover the first central aperture, said cover member having a recess defined therein by a substantially cylindrical sidewall, wherein an interior surface of said substantially cylindrical sidewall of said cover member comprises at least one protrusion projecting radially inward;
    a wedge ring having a generally cylindrical body accommodated by said first central aperture and configured to operatively engage said cover member, and at least one upper lip configured to engage said at least one protrusion;
    a drive mechanism configured to rotate said wedge ring about the central axis, such that a rotation of said wedge ring in a first direction causes said wedge ring to urge said cover member in an axial direction along the central axis into a sealed position and a rotation of said wedge ring in a second direction opposite the first direction about the central axis causes said wedge ring to release from said cover member so as to allow said cover member to move in the axial direction away from said bulkhead into an unsealed position;
    a first gear cooperatively coupled to and reversibly rotatable by said drive mechanism within a second angular range about a third direction and a fourth direction opposite the third direction; and
    a second gear having another central aperture concentric with the first central aperture, said second gear fastened to said wedge ring and cooperatively coupled to and reversibly rotatable by said first gear within a first angular range about the first and second directions.

2. The reversible sealing mechanism of claim 1, wherein said at least one protrusion comprises first, second, third, and fourth protrusions; and
    wherein said at least one lip comprises first, second, third, and fourth upper lips configured to engage said first, second, third, and fourth protrusions respectively.

3. The reversible sealing mechanism of claim 1, further comprising a frame, wherein said drive mechanism is accessible through said frame and operative from outside said frame and outside said second compartment.

4. The reversible sealing mechanism of claim 1, further comprising a frame having a port configured to permit access to the drive mechanism for actuation of said drive mechanism.

5. The reversible sealing mechanism of claim 4, wherein the frame is arranged about the wedge ring, and wherein the port defines an axis oriented generally perpendicular to the central axis.

6. A reversible sealing mechanism for sealing a bulkhead disposed between first and second compartments, the bulkhead having a first central aperture defined about a central axis, said mechanism comprising:
    a cover member configured to cover the first central aperture, said cover member having a recess defined therein by a substantially cylindrical sidewall, wherein an interior surface of said substantially cylindrical sidewall of said cover member comprises at least one protrusion projecting radially inward;
    a sealing ring having a second central aperture concentric to said first central aperture and disposed between a first major surface of the bulkhead and said cover member;
    a wedge ring having a generally cylindrical body accommodated by said first central aperture and configured to operatively engage said cover member, and at least one upper lip configured to engage said at least one protrusion; and
    a mechanical input operative to rotate said wedge ring about the central axis, such that a rotation of said wedge ring in a first direction causes said wedge ring to urge said cover member in an axial direction along the central axis into a sealed position and a rotation of said wedge ring in a second direction opposite the first direction about the central axis causes said wedge ring to release from said cover member so as to allow said cover member to move in the axial direction away from said bulkhead into an unsealed position.

7. A reversible sealing mechanism for sealing a bulkhead disposed between first and second compartments, the bulkhead having a first central aperture defined about a central axis, said mechanism comprising:
    a cover member configured to cover the first central aperture, said cover member having a recess defined therein by a substantially cylindrical sidewall, wherein an interior surface of said substantially cylindrical sidewall of said cover member comprises at least one protrusion projecting radially inward;
    a wedge ring having a generally cylindrical body accommodated by said first central aperture and configured to operatively engage said cover member, and at least one upper lip configured to engage said at least one protrusion; and a drive mechanism configured to rotate said wedge ring about the central axis, such that a rotation of said wedge ring in a first direction causes said wedge ring to urge said cover member in an axial direction along the central axis into a sealed position and a rotation of said wedge ring in a second direction opposite the first direction about the central axis causes said wedge ring to release from said cover member so as to allow said cover member to move in the axial direction away from said bulkhead into an unsealed position, wherein said drive mechanism comprises a ratchet clutch mechanism.

8. A sealing mechanism for reversibly sealing a passage between first and second compartments, said mechanism comprising:
- a bulkhead having a first central aperture defined about a central axis and upper and lower major surfaces, said bulkhead disposed between the first and second compartments, said first central aperture defining the passage;
- a wedge ring having a generally cylindrical body accommodated by said first central aperture, said wedge ring having an upper lip and a lower lip, said upper and lower lips projecting radially outward from said body, a lower surface of said upper lip sloping towards said lower lip in a circumferential direction about said wedge ring, said lower lip having an outer diameter larger than the first central aperture;
- a cover member covering at least the first central aperture, and having a substantially cylindrical sidewall defining a recess therein said recess facing said bulkhead, said sidewall having at least first and second protrusions extending radially inward into said recess, wherein said recess receives said upper lip of said wedge ring;
- a drive mechanism configured to rotate said wedge ring about the central axis reversibly between a sealed position and an unsealed position within a first angular range, wherein, as the wedge ring is rotated from the unsealed position to the sealed position, said lower surface of said upper lip slidingly engages and urges axially said at least first and second protrusions respectively toward said bulkhead; and
- a frame arranged about the wedge ring and comprising a port configured to permit access to the drive mechanism for actuation of said drive mechanism, wherein the port defines an axis oriented generally perpendicular to the central axis.

9. The sealing mechanism of claim 8, further comprising a sealing ring disposed between said upper major surface of said bulkhead and said cover member and having a second central aperture aligned with said first central aperture.

10. The sealing mechanism of claim 9, wherein said sealing ring further comprises at least one alignment pin extending generally orthogonally in an axial direction therefrom, and
wherein said bulkhead further comprises at least one through aperture configured to receive the at least one alignment pin.

11. The sealing mechanism of claim 8, wherein said drive mechanism comprises a ratchet clutch mechanism.

12. The sealing mechanism of claim 8, further comprising:
- a first gear cooperatively coupled to and reversibly rotatable by said drive mechanism along a second axis and within a second angular range about a third direction and a fourth direction opposite the third direction; and
- a second gear having a central aperture defined along the central axis, said second gear fastened to said wedge ring and cooperatively coupled to and reversibly rotatable by said first gear,
wherein a rotation of said first gear within the second angular range about the third and fourth directions causes the wedge ring to rotate within the first angular range about first and second directions respectively.

13. The sealing mechanism of claim 12, wherein said second gear comprises a bevel gear.

14. The sealing mechanism of claim 12, wherein the third and fourth directions are about an axis perpendicular to the central axis.

15. The sealing mechanism of claim 8, wherein said cover member further comprises third and fourth protrusions extending radially inward into said recess; and
wherein said wedge ring further comprises second, third and fourth upper lips having lower surfaces configured to engage said second, third and fourth protrusions respectively.

16. The sealing mechanism of claim 8, further comprising a turntable bearing comprising:
- an inner rotatable element securely fastened to said lower lip of said wedge ring; and
- an outer rotatable element securely fastened to said lower major surface of said bulkhead.

17. The sealing mechanism of claim 8, wherein said cover member further comprises at least one through aperture, said through aperture opening in said first central aperture.

18. A sealing mechanism for reversibly sealing a passage between first and second compartments, said mechanism comprising:
- a bulkhead having a first central aperture defined about a central axis and upper and lower major surfaces, said bulkhead disposed between the first and second compartments, said first central aperture defining the passage;
- a wedge ring having a generally cylindrical body accommodated by said first central aperture, said wedge ring having an upper lip and a lower lip, said upper and lower lips projecting radially outward from said body, a lower surface of said upper lip sloping towards said lower lip in a circumferential direction about said wedge ring, said lower lip having an outer diameter larger than the first central aperture;
- a cover member covering at least the first central aperture, and having a substantially cylindrical sidewall defining a recess therein said recess facing said bulkhead, said sidewall having at least first and second protrusions extending radially inward into said recess, wherein said recess receives said upper lip of said wedge ring;
- a drive mechanism configured to rotate said wedge ring about the central axis reversibly between a sealed position and an unsealed position within a first angular range, wherein, as the wedge ring is rotated from the unsealed position to the sealed position, said lower surface of said upper lip slidingly engages and urges axially said at least first and second protrusions respectively toward said bulkhead; and
- an electronic sensor configured to monitor a rotational displacement of said wedge ring.

* * * * *

UNITED STATES PATENT AND TRADEMARK OFFICE
CERTIFICATE OF CORRECTION

PATENT NO.         : 8,851,786 B2                                                Page 1 of 1
APPLICATION NO.    : 12/628849
DATED              : October 7, 2014
INVENTOR(S)        : John Snediker et al.

It is certified that error appears in the above-identified patent and that said Letters Patent is hereby corrected as shown below:

On the Title page

Item (73), Assignee, the name should be "Lockheed Martin Corporation."

Signed and Sealed this
Thirtieth Day of December, 2014

Michelle K. Lee
*Deputy Director of the United States Patent and Trademark Office*